(12) United States Patent
Vitarelli (10) Patent No.: US 11,668,094 B2
(45) Date of Patent: Jun. 6, 2023

(54) MULTI-DIRECTIONAL GUTTER DOWNSPOUT SYSTEM, AND METHODS OF MAKING AND USING SAME

(71) Applicant: Ronald P. Vitarelli, Ivoryton, CT (US)

(72) Inventor: Ronald P. Vitarelli, Ivoryton, CT (US)

( * ) Notice: Subject to any disclaimer, the term of this patent is extended or adjusted under 35 U.S.C. 154(b) by 384 days.

(21) Appl. No.: 16/881,288

(22) Filed: May 22, 2020

(65) Prior Publication Data

US 2020/0370300 A1 Nov. 26, 2020

Related U.S. Application Data

(60) Provisional application No. 62/852,119, filed on May 23, 2019.

(51) Int. Cl.
| | | |
|---|---|---|
| *E04D 13/08* | (2006.01) | |
| *F16L 9/22* | (2006.01) | |
| *F16L 43/00* | (2006.01) | |

(52) U.S. Cl.
CPC .............. *E04D 13/08* (2013.01); *F16L 9/22* (2013.01); *F16L 43/008* (2013.01); *E04D 2013/0813* (2013.01); *E04D 2013/0833* (2013.01); *E04D 2013/0866* (2013.01)

(58) Field of Classification Search
CPC ............ E04D 13/08; E04D 2013/0806; E04D 2013/0813; E04D 2013/0833; E04D 2013/0846; F16L 9/22; F16L 43/008
USPC .................................................. 138/156–171
See application file for complete search history.

(56) References Cited

U.S. PATENT DOCUMENTS

| | | | |
|---|---|---|---|
| 455,910 A | 7/1891 | Gordon | |
| 3,076,669 A | 2/1963 | Schlein | |
| 3,316,928 A | 5/1967 | Weakley | |
| 3,375,851 A | 4/1968 | Glenn et al. | |
| 3,459,234 A * | 8/1969 | Sauter | F16L 59/024 138/156 |
| 3,911,954 A | 10/1975 | Johnson | |
| 4,173,361 A * | 11/1979 | Gagas | F16L 25/14 285/424 |
| 5,358,006 A | 10/1994 | Sweers | |
| 5,358,007 A | 10/1994 | Carlberg | |
| 5,375,891 A | 12/1994 | Sicotte et al. | |
| 5,658,092 A | 8/1997 | Sweers | |
| 6,026,845 A | 2/2000 | Walrath et al. | |
| 6,109,293 A | 8/2000 | Walrath et al. | |

(Continued)

FOREIGN PATENT DOCUMENTS

| | | |
|---|---|---|
| CA | 1169224 A | 6/1984 |
| EP | 0338503 A1 * | 10/1989 |
| JP | 2004003180 A * | 1/2004 |

OTHER PUBLICATIONS

Machine translation JP 2004003180.*
Machine translation EP 0338503.*

*Primary Examiner* — Kevin F Murphy
(74) *Attorney, Agent, or Firm* — UConn IP Law Clinic; Meghan McDermott; Nestor Rodriguez Smyt (57) ABSTRACT

Disclosed herein is a water diverter comprising an adapter having a first end portion configured to be mounted to a lower end section of a gutter downspout, and a second end portion, and a curved pipe rotatably attached to the second end portion. Methods of making and using the diverter, and corresponding systems, also are described.

18 Claims, 6 Drawing Sheets

(56) References Cited

U.S. PATENT DOCUMENTS

| | | | |
|---|---|---|---|
| 6,308,464 B1* | 10/2001 | Demartini | E04D 13/08 |
| | | | 52/16 |
| 7,100,641 B2* | 9/2006 | Tyrer | H02G 3/0481 |
| | | | 138/158 |
| 7,210,505 B2* | 5/2007 | Harpenau | F16L 9/17 |
| | | | 285/182 |
| 8,864,180 B2* | 10/2014 | Harman | E04D 13/0645 |
| | | | 52/16 |
| 9,458,955 B2* | 10/2016 | Hammer | F16L 9/128 |
| 9,783,989 B2 | 10/2017 | Elder | |
| 9,890,520 B2 | 2/2018 | Brucker | |
| 9,988,817 B2 | 6/2018 | Johnson | |
| 10,053,867 B2 | 8/2018 | Sinclair | |
| 10,106,971 B2 | 10/2018 | Villanueva | |
| 2007/0204522 A1 | 9/2007 | Tredennick | |
| 2009/0243287 A1 | 10/2009 | Travis | |
| 2011/0067319 A1 | 3/2011 | Anthony | |
| 2014/0117661 A1 | 10/2014 | Harman et al. | |

\* cited by examiner

MULTI-DIRECTIONAL GUTTER DOWNSPOUT SYSTEM, AND METHODS OF MAKING AND USING SAME

CROSS-REFERENCE TO RELATED APPLICATIONS

This application claims the benefit of, and priority to, U.S. Provisional Patent Application No. 62/852,119 filed May 23, 2019, the contents of which are incorporated herein by reference in their entirety.

BACKGROUND

This disclosure relates generally to gutter downspouts, and more particularly to gutter downspout water diverters.

Gutter downspout water diverters are generally known. Water diverters have features including changing the direction of water flow or elongating the distance of water flow. It is problematic when water diverters are restricted in which direction water can be diverted, or the water diverter itself is too complex or has too many parts.

It would be useful to improve the flow from a gutter downspout in a simple manner.

SUMMARY

One embodiment described herein is a water diverter comprising an adapter having a first end portion configured to be mounted to a lower end section of a gutter downspout, and a second end portion, and a rotatable curved pipe removably attached to the second end portion.

In embodiments, the adapter includes a radially protruding terminal lip. In some cases, the curved pipe has a first end section including a channel configured to surround the terminal lip of the adapter. In embodiments, the first end portion of the adapter has generally the same cross-sectional dimensions as the gutter downspout to limit leakage between the gutter downspout and the adapter after mounting. In certain embodiments, the channel is formed on a radially outwardly projecting portion of the first end section of the curved pipe. In embodiments described herein, the curved pipe includes first and second pipe halves that are removably connected to one another by a snap fit after being disposed around the terminal lip of the adapter. In some cases, the curved pipe is elbow-shaped.

Another embodiment described herein is a method of making a water diverter, comprising obtaining an adapter having a first end portion configured to be mounted to a lower end of a gutter downspout, and a second end portion having a radially protruding lip, obtaining first and second curved pipe halves, each having a semi-circular cross-section and being configured to be removably attached to the second end portion of the adapter around the radially protruding lip, and mounting, by a snap fit, the first and second curved pipe-halves around the lip of the adapter to form a rotatable curved pipe.

In embodiments, the adapter and the first and second curved pipe halves are dimensioned such that, after connection of the first and second pipe halves around the adapter, the inner diameter of the channel is no more than 0.5 mm smaller than the outer diameter of the radially protruding lip. In some cases, the adapter and the first and second curved pipe halves are dimensioned such that, after connection of the first and second pipe halves around the adapter, the inner diameter of the channel is no more than 1 mm smaller than the outer diameter of the radially protruding lip. In some instances, the adapter and the first and second curved pipe halves are dimensioned such that, after connection of the first and second pipe halves around the adapter, the height of the channel is no more than 0.5 mm larger than the maximum thickness of the radially protruding lip. In embodiments, the adapter and the first and second curved pipe halves are dimensioned such that, after connection of the first and second pipe halves around the adapter, the height of the channel is no more than 1 mm larger than the maximum thickness of the radially protruding lip.

Yet another embodiment is a method of directing a flow of water from a gutter downspout, comprising obtaining a water diverter comprising an adapter having a first end portion configured to be mounted to a lower end portion of the gutter downspout, and a second end portion, and a curved pipe rotatably attached to the second end portion, mounting the first end portion of the adapter to the lower end portion of the gutter downspout, and rotating the curved pipe relative to the gutter downspout to direct the flow of water. In embodiments, the first end portion of the adapter is mounted to the gutter downspout using at least one of screws, bolts, adhesive, welding, a clamp and a snap fit.

DETAILED DESCRIPTION

The embodiments described herein overcome problems associated with prior known water diverters. The adapter portion of the device is designed to take the outflow from a gutter downspout and direct it through a curved pipe. The downspout is connected to the pipe by the adapter. In one embodiment, the pipe has an upper end section with a circular channel configured to receive a cylindrical lip formed at the lower end of an adapter. In another embodiment, the adapter has a lower end section with a circular channel configured to receive a cylindrical lip form at the upper end of the pipe. The interaction between the lip and the channel enables rotational movement of the pipe relative to the adapter. The disclosed water diverters can be quickly and easily rotated to change the direction of water flow from a gutter downspout.

The device is intended for residential and commercial use; however, the target market is for residential use. The invention can be designed for application to any standard gutter system. The cylindrical lip on one of the adapter and the pipe, and the corresponding circular channel on the other of the adapter and the pipe, allow for rotation of the pipe relative to the adapter, and ease of different attachments. For example, the curved pipe halves can be mounted around the adapter, or adapter halves can be mounted around the curved pipe. In other cases, the adapter and the pipe are both formed as single pieces and the adapter is attached to the pipe by snap fit.

In one embodiment, after assembly the water diverter includes two pieces: (1) a fixed sleeve (rectangular or cylindrical in shape at a first end depending on the shape of the gutter downspout), with a cylindrical lip or raised area at a second end, and (2) a cylindrical, curved pipe transition, with a grooved end that fits over the radially protruding terminal lip of the fixed sleeve. The fixed sleeve functions as an adapter. The purpose of the two pieces is to enable the pipe to rotate from about 45 to about 360 degrees, or from about 90 to about 360 degrees, or from about 120 to about 270 degrees, so water can be discharged in various directions away from the gutter downspout. The connections between the downspout and the adapter, and between and adapter and the pipe are tight so a heavy downpour will not lead to water being dispelled through the connection or impact the degree of rotation. The disclosed embodiments are different than prior known water diverters because they feature a multi-directional, two-piece system that requires no additional attachments or extensions to change the water direction.

In embodiments, the adapter has a straight configuration with a rectangular cross section at the end that connects to the downspout and a circular cross section at the end that connector to the curved pipe.

In embodiments, the curved pipe is circular in cross section, but alternatively can have a cross section that is oval, rectangular, hexagonal or of another geometric shape. Furthermore, the pipe can have a first end with one type of cross-sectional shape and an opposite end with another cross-sectional shape.

Figure 1:
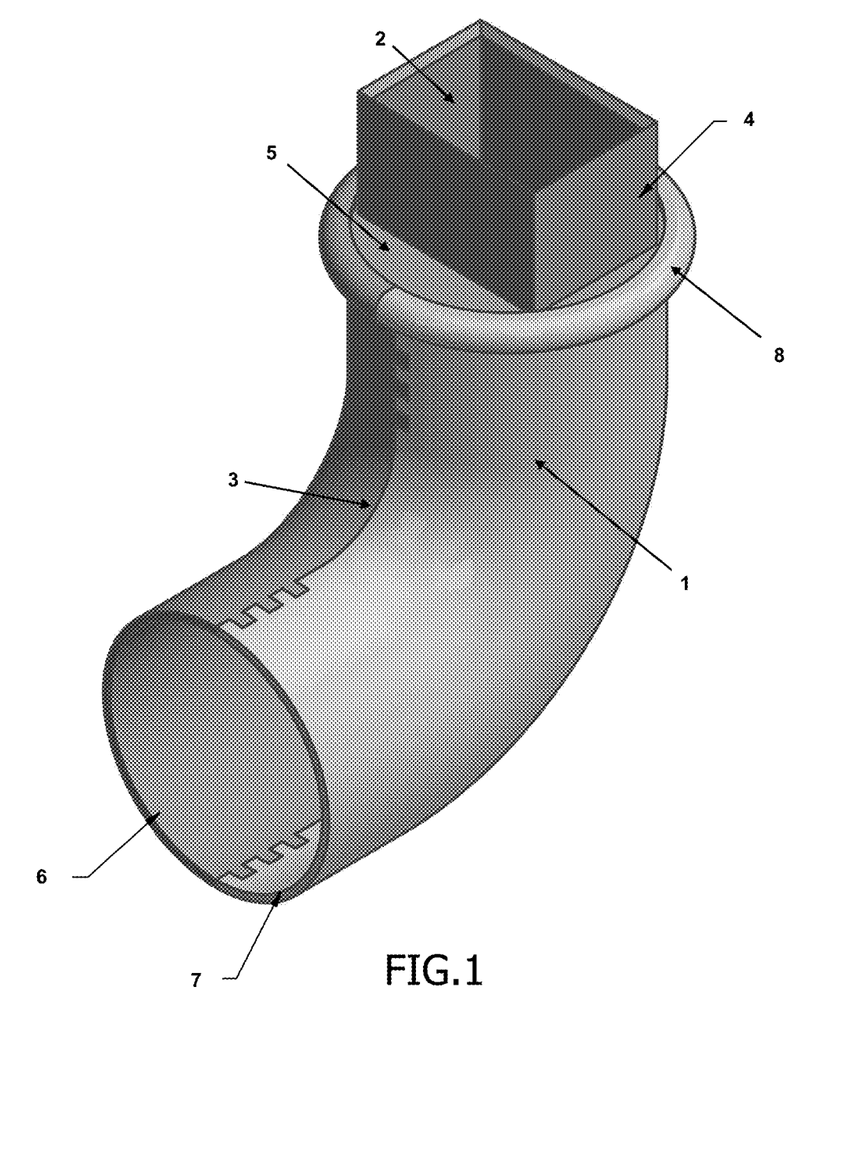
FIG. 1 shows a perspective view of a first embodiment of a water diverter.
Figure 3:
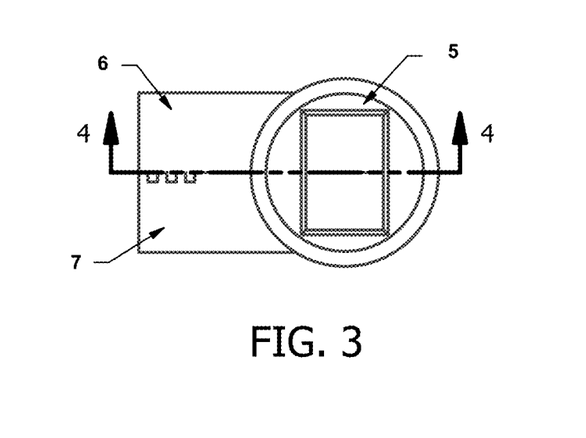
FIG. 3 is a schematic top view of the water diverter.
Figure 4:
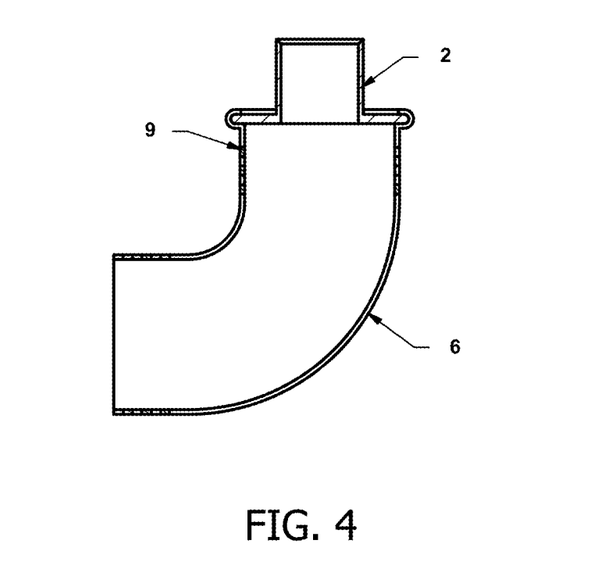
FIG. 4 is a longitudinal cross-sectional view of the water diverter taken along line 4-4 shown in FIG. 3.

Referring to FIGS. 1, 3 and 4, a water diverter is shown and is generally designed as 1. The water diverter 1 includes an adapter 2 and a curved pipe 3. In the embodiment shown in FIG. 1, the curved pipe is elbow-shaped. The adapter 2 has an upper portion 4 configured to be removably attached to a gutter downspout and a lower portion 5 configured to be attached to the pipe 3. The pipe 3 has a first half 6 and a second half 7 connected to one another a snap fit, forming an upper pipe portion 8 configured to surround the lower portion 5 of the adapter 2.

Figure 2:
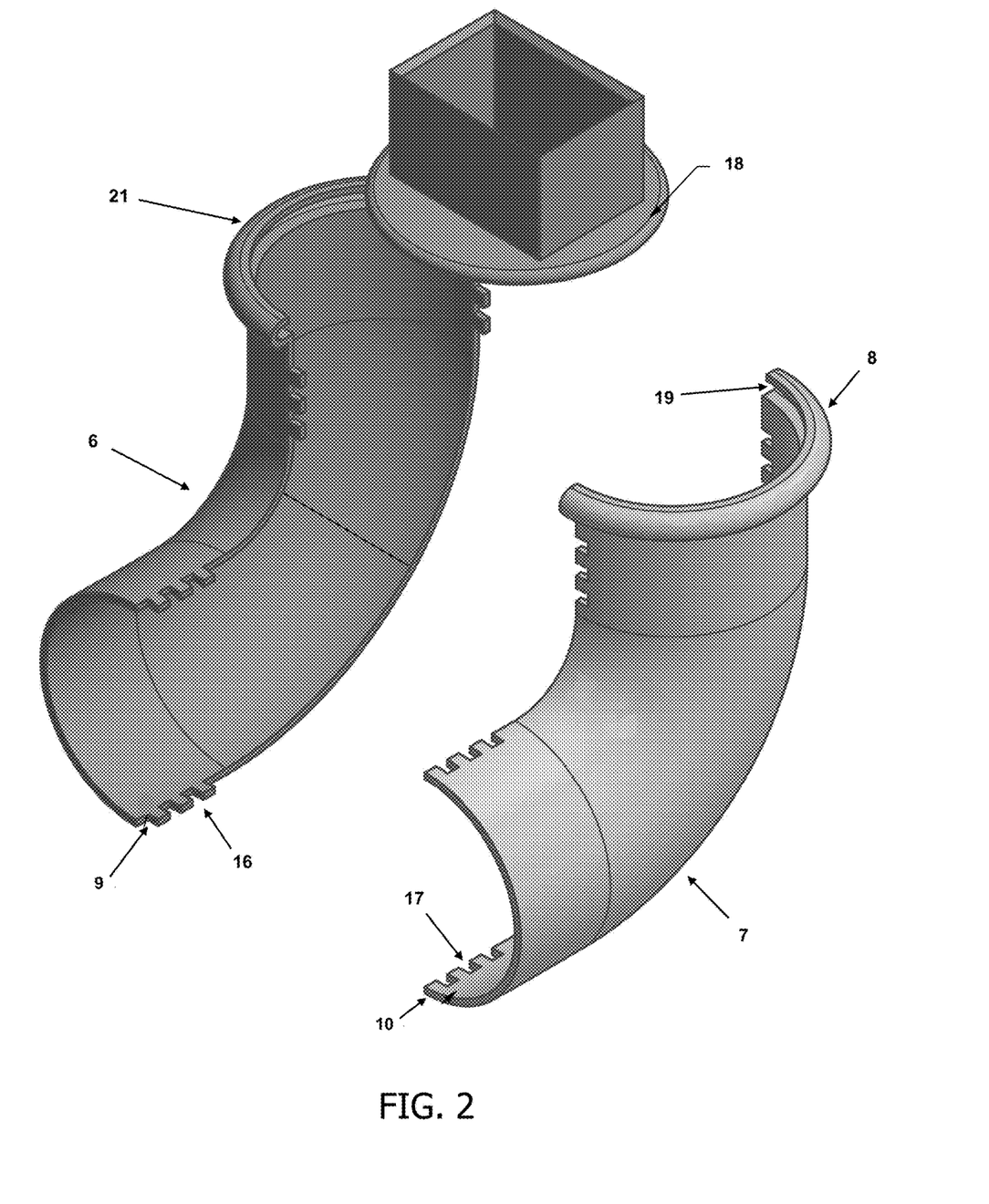
FIG. 2 is an exploded view of the water diverter shown in FIG. 1.

FIG. 2 is an exploded view of the water diverter 1, showing details of the pipe half 6 containing alternating ridges 9 and openings 16 along the interior ends, designed to fit with the ridges 10 and openings 17 of the pipe half 7. The view also shows the radially-protruding lip 18 formed at the lower edge of the lower portion 5 of the adapter 2, and the channel 19 formed in the radially projecting section 21 of the upper pipe portion 8 of the pipe 3. The channel 19 of the pipe 3 surrounds the lip 18 of the adapter 2 when the water diverter 1 is an assembled configuration. In other embodiments (not shown) the channel 19 is formed on a portion of the inner surface of the pipe that does not project radially outwardly.

Figure 5:
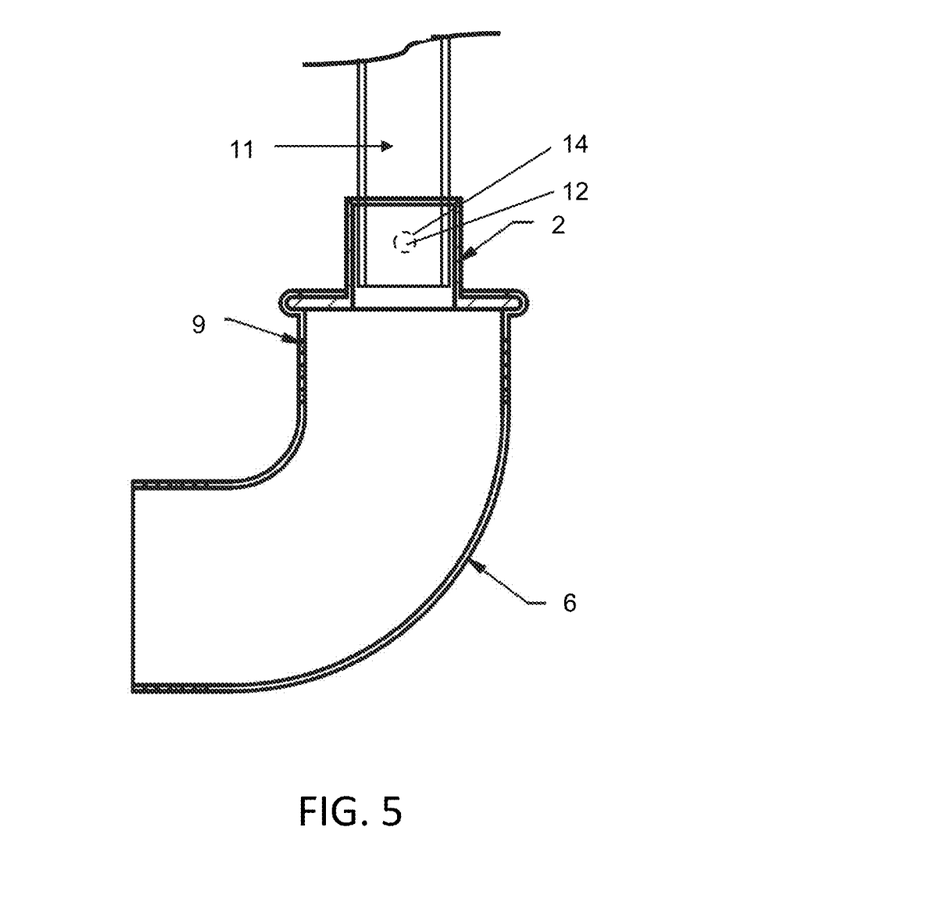
FIG. 5 is a longitudinal cross-sectional view of the water diverter mounted into a gutter downspout with screws.

FIG. 5 shows a cross-sectional view of the water diverter 1 attached to the outside of a downspout of a gutter 11 with optional screws 12. In this embodiment, a pair of holes 14 optionally are formed in the upper portion 4 of the adapter if the adapter 2 is to be fastened with screws. In embodiments, the upper portion 4 of the adapter 2 alternatively can be positioned inside the lower end of the gutter 11.

Figure 6:
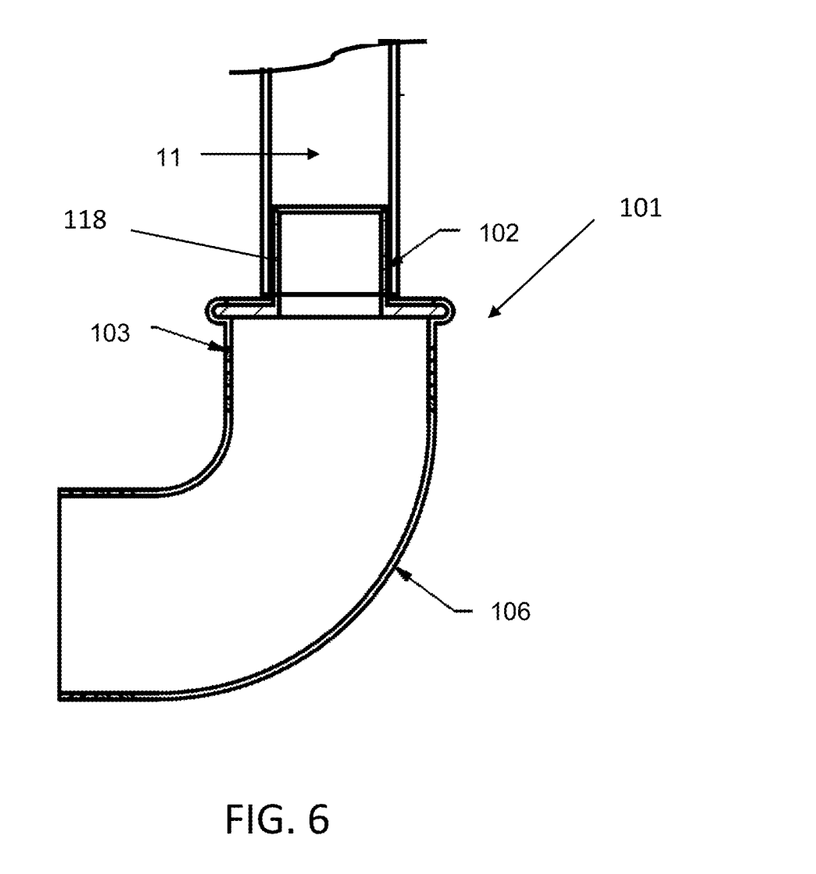
FIG. 6 shows a longitudinal cross-sectional view of an alternative embodiment of the water diverter mounted to a gutter downspout without screws.

FIG. 6 shows another embodiment of a water diverter 101 including an adapter 102 and a pipe 103 in which screws are not needed to connect the adapter 102 to the gutter 11 and therefore it is not necessary to includes holes in the upper portion of the adapter 102. Instead, an adhesive 118 or other connector, such as hook and loop fastener (e.g. Velcro), an external clamp, etc. connects the gutter 11 to the adapter 102. FIG. 6 shows the adapter 102 positioned inside the gutter 11, but as an alternative the adapter can be positioned outside the gutter as is illustrated in FIG. 5.

Figure 7:
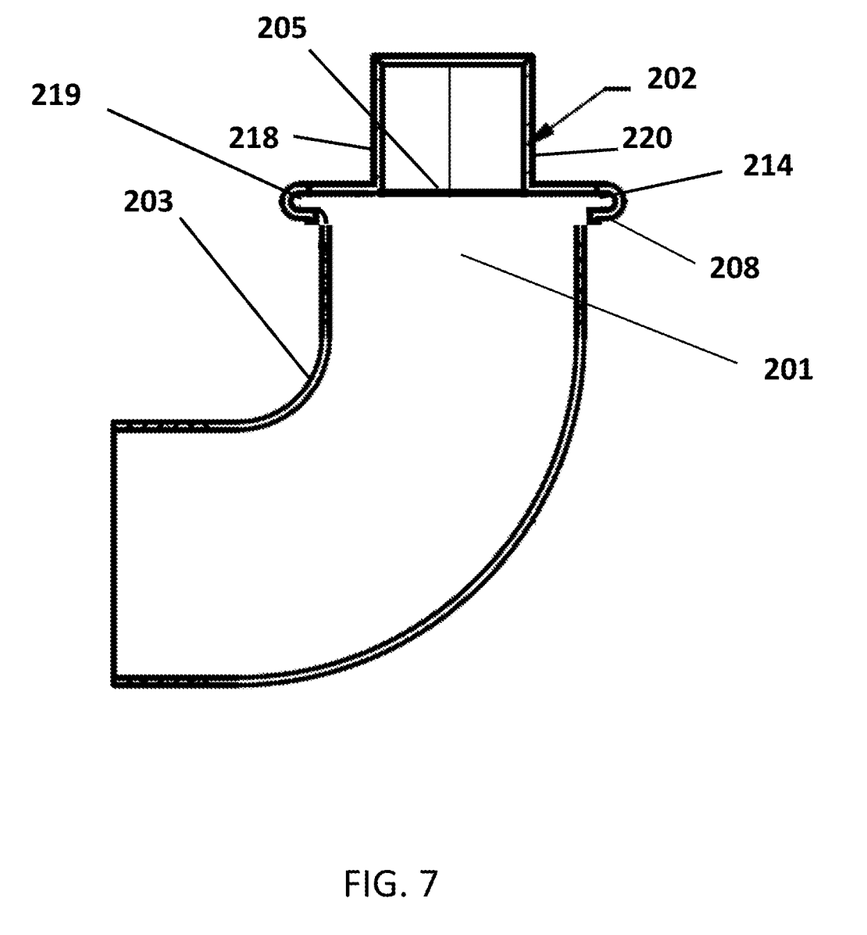
FIG. 7 shows a longitudinal cross section of another embodiment of the water diverter in which the adapter is formed from two pieces.

FIG. 7 shows an embodiment of a water diverter 201 with an adapter 202 and a pipe 203. The lip 214 is formed on upper pipe portion 208 of the pipe 203 and the channel 219 is formed on the lower portion 205 of the adapter 202. In this embodiment, the water diverter includes a first adapter half 218 and a second adapter half 220 that are joined together by a snap fit to form a channel 219 that receives the pipe lip 214.

The preferred composition of the water diverter can comprise a thermoplastic material, a thermoset material, a metal, or composites of metal with a thermoplastic or thermoset material. In embodiments, the water diverter is 3D printed. In some cases, the composition of the 3D printed water diverter is or acrylonitrile butadiene styrene (ABS) or polylactic acid (PLA), but the attachment can be manufactured with other suitable thermoplastic or thermoset polymers. In some cases, the water diverter is formed from a lightweight metallic composition that matches the gutter downspout. In some cases, the adapter is formed from the same composition as the pipe. In other cases, the adapter and the pipe are formed from different materials.

One way to manufacture the first embodiment of the water diverter involves the use of a multi-part injection mold. One part forms the gutter downspout adapter and the other two parts form the two halves of the curved pipe. If the halves are identical in construction, they can be formed using the same mold. Otherwise, separate molds would be used for the two halves of the pipe. The advantage of manufacturing the pipe from two pieces is that this can help to ensure a tight fit around the downspout adapter. The three pieces are then put together as a whole, with the first and second pipe pieces being positioned around the adaptor, as depicted in FIG. 4, and then adhered to one another by a snap fit.

In some cases, the adapter and the first and second curved pipe halves are dimensioned such that, after adhesion of the first and second pipe halves around the adapter, difference between the inner diameter of the channel and the outer diameter of the radially protruding lip is no more than 0.5 mm (with the inner diameter of the channel being slightly larger than the outer diameter of the lip). In other cases, the difference between these two dimensions is 0.3 mm to 1 mm. In some cases, the adapter and the first and second curved pipe halves are dimensioned such that, after adhesion of the first and second pipe halves around the adapter, the height of the channel is no more than 0.5 mm larger than the maximum thickness of the radially protruding lip. Sometimes the difference between these two dimensions is 0.3 mm to 1 mm.

In another embodiment, the attachment is formed first, and then the pipe is directly mounted by snap fit around the attachment as a single piece.

The dimensions of the attachment will range depending on gutter downspout configuration and other factors. Non-limiting examples of suitable ranges for the dimensions include about 3 to about 6-inches diameter for pipe bottom, about 3 to about 7-inches diameter for where the two pieces meet above the center of the curve, and about 3 to about 7-inches diameter where the top of the attachment meets the gutter downspout (for reference, a standard gutter would fit into an apparatus with the diameter of 4¾-inches). The length of the apparatus typically will range from about 8 to about 12 inches. The curved pipe can be manufactured to exhibit a bend formed at an angle ranging from about 90 degrees to about 155-degrees, or about 90 degrees to about 120 degrees, or about 90 degrees to about 100 degrees.

In embodiments, the pipe portion of the water diverter has a wall thickness of about 0.1 to about 0.3 inches, or about 0.1 to about 0.2 inches, or about 0.15 inches. When the pipe is formed from two sections, each of which may have a length of about 6 to about 10 inches, or about 7 to about 9 inches, or about 8 inches. The pipe portion may have an inner diameter of about 3 to about 5 inches, or about 3.5 to about 4.5 inches, or about 4 inches. The radially projecting upper portion of the pipe containing the channel may have an outer diameter of about 4 to about 6 inches, or about 4.5 to about 5.5 inches, or about 4.6 to about 5 inches. The upper portion of the adapter is sized for a tight fit either inside the walls of the gutter downspout or outside the walls of the gutter downspout. In embodiments, the upper portion has a cross-sectional length, as measured from the outer side of the wall, of about 3 to about 4 inches, or about 3.2 to about 3.5 inches, and a cross-sectional width, as measured from the outer side of the wall, of about 2 to about 3 inches, or about 2.2 to about 2.5 inches.

The consumer installs the attachment via connecting the fixed rectangular sleeve to the gutter downspout such that it cannot slide on anymore. The adapter can be attached to the gutter downspout in a suitable manner that it will remain in place during downpours and heavy winds. In one embodiment, a screw holds the sleeve in place. In some cases, the screw is a stainless steel, self-tapping, ½-inch screw. The application of this screw is common in the construction of gutter assembly and will not impact negatively the invention or flow of water. The adaptor may also be attached to the gutter downspout by adhesive (including a hook-and-loop fastener), welding, clamping, or snap fit. In other cases, these is a tight interference fit between the adapter and the gutter, or an elastic ring if placed between the overlapping portions of the adapter and gutter.

The following example is included to aid in the understanding of the disclosed embodiments, but are not intended to the scope of the claims.

Example 1

A water diverter prototype was 3D-printed from acrylonitrile butadiene styrene (ABS). The adapter had an upper section with a cross sectional length of about 3 inches, a cross sectional width of about 2 inches, and a lower section with a circular outer diameter of about 4.4 inches. The pipe had two sections having a length of about 8 inches each, connected at an angle similar to that shown in the pipe of FIG. 1. The pipe had an inner diameter of about 4 inches. The radial space between the outer portion of the adapter lip and the inner diameter of the wall defining the channel was 0 to 0.5 mm. The tightness of the connection between the adapter and the pipe was such that the manual force needed to turn the pipe was comparable to the force needed to open a previously opened water bottle screw cap. The prototype was rotated by hand and was capable of being rotated 360 degrees. Water was run through with different intensities (heavy, medium, light, and trickle) and with high water pressure, and throughout the tests the orientation of the pipe did not change as a result of water flow through the pipe.

The apparatus is distinguished from the prior art in that it can rotate in any direction the user wants without the need for multiple downspout pipe connections, which use a variety of unrelated fittings and pipe pieces.

A number of alternatives, modifications, variations, or improvements therein may be subsequently made by those skilled in the art, which are also intended to be encompassed by the following claims.

What is claimed is:

1. A water diverter, comprising:
   an adapter having a first end portion configured to be mounted to a lower end section of a gutter downspout, and a second end portion having a radially protruding terminal lip,
   a curved pipe rotatably attached to the second end portion, the curved pipe including first and second pipe halves that are removably connected to one another by a snap fit after being disposed around the terminal lip of the adapter,
   wherein the first curved pipe half has alternating ridges and openings along the interior ends that connect to alternating ridges and openings of the second curved pipe half by the snap fit.

2. The water diverter of claim 1, wherein the curved pipe is configured to rotate at least 270 degrees relative to the adapter.

3. The water diverter of claim 1, wherein the curved pipe has a first end section including a channel configured to surround the terminal lip of the adapter.

4. The water diverter of claim 3, wherein the channel is formed on a radially outwardly projecting portion of the first end section of the curved pipe.

5. The water diverter of claim 3, wherein at least one of the adapter and the curved pipe comprises an elastic material.

6. The water diverter of claim 1, wherein the first end portion of the adapter has generally the same cross-sectional dimensions as the gutter downspout to limit leakage between the gutter downspout and the adapter after mounting.

7. The water diverter of claim 1, wherein the first end portion of the adapter has a rectangular cross section.

8. The water diverter of claim 1, wherein the second end portion of the adapter has a circular cross section.

9. The water diverter of claim 1, wherein the adapter is formed as a one-piece component and the curved pipe is formed as a two-piece component.

10. A system comprising the water diverter of claim 1 mounted to a gutter downspout.

11. A method of making a water diverter, comprising:
    obtaining an adapter having a first end portion configured to be mounted to a lower end of a gutter downspout, and a second end portion having a radially protruding lip,
    obtaining first and second curved pipe halves, each having a semi-circular cross-section and being configured to be attached by a snap fit to the second end portion of the adapter around the radially protruding lip, and
    removably attaching the first and second curved pipe-halves to each other and around the lip of the adapter by the snap fit of alternating ridges and openings along interior ends of the first and second curved pipe-halves to form a rotatable curved pipe.

12. The method of claim 11, wherein at least one of the adapter and the first and second pipe halves is 3D printed.

13. The method of claim 11, further comprising attaching the first end portion of the adapter to a gutter downspout.

14. The method of claim 11, wherein the curved pipe has a first end section including a channel configured to surround the radially protruding lip of the adapter, and the adapter and the first and second curved pipe halves are dimensioned such that, after connection of the first and second pipe halves around the adapter, the inner diameter of the channel is no more than 0.5 mm smaller than the outer diameter of the radially protruding lip.

15. The method of claim 11, wherein the curved pipe has a first end section including a channel configured to surround the radially protruding lip of the adapter, and the adapter and the first and second curved pipe halves are dimensioned such that, after connection of the first and second pipe halves around the adapter, the inner diameter of the channel is no more than 1 mm smaller than the outer diameter of the radially protruding lip.

16. The method of claim 11, wherein the curved pipe has a first end section including a channel configured to surround the radially protruding lip of the adapter, and the adapter and the first and second curved pipe halves are dimensioned such that, after connection of the first and second pipe halves around the adapter, the height of the channel is no more than 0.5 mm larger than the maximum thickness of the radially protruding lip.

17. The method of claim 11, wherein the curved pipe has a first end section including a channel configured to surround the radially protruding lip of the adapter, and the adapter and the first and second curved pipe halves are dimensioned such that, after connection of the first and second pipe halves around the adapter, the height of the channel is no more than 1 mm larger than the maximum thickness of the radially protruding lip.

18. A method of directing a flow of water from a gutter downspout, comprising:
    obtaining a water diverter comprising:
        an adapter having a first end portion configured to be mounted to a lower end portion of the gutter downspout, and a second end portion, and
        a rotatable curved pipe having first and second curved pipe-halves removably attached to each other and to the second end portion by a snap fit of alternating ridges and openings formed along the interior ends of the first and second curved pipe-halves,
    mounting the first end portion of the adapter to the lower end portion of the gutter downspout, and
    rotating the curved pipe relative to the gutter downspout to direct the flow of water.

\* \* \* \* \*